United States Patent [19]
Akano et al.

[11] Patent Number: 4,996,064
[45] Date of Patent: Feb. 26, 1991

[54] NOVEL FOODSTUFF FROM SOYMILK AND METHOD FOR PRODUCTION THEREOF

[75] Inventors: Hirofumi Akano; Takeshi Sato; Hajime Okumura; Yoshiya Kawamura, all of Aichi; Kyo Shimada, Mie, all of Japan

[73] Assignee: Nakano Vinegar Co., Ltd., Aichi, Japan

[21] Appl. No.: 396,662

[22] Filed: Aug. 22, 1989

[30] Foreign Application Priority Data

Aug. 24, 1988 [JP] Japan ................................ 63-208287
May 18, 1989 [JP] Japan ................................ 1-125268

[51] Int. Cl.$^5$ ................................................ A23L 1/20
[52] U.S. Cl. .......................................... 426/46; 426/62; 426/634; 426/582; 426/583; 426/573; 426/574; 426/581; 426/641; 426/643; 426/557; 426/565; 426/579; 426/602; 426/585; 426/577
[58] Field of Search ................ 426/46, 61, 60, 62, 426/36, 634, 656, 582, 583, 573, 574, 581, 641, 643, 557, 565, 579, 602, 585, 577

[56] References Cited

U.S. PATENT DOCUMENTS 3,640,725  2/1972  Sherba et al. .................... 426/46
3,852,480 12/1974  Williams .......................... 426/46

FOREIGN PATENT DOCUMENTS 3177762  7/1988  Japan ............................... 426/46

Primary Examiner—Marianne Cintins
Attorney, Agent, or Firm—Cushman, Darby & Cushman

[57] ABSTRACT

A novel foodstuff is produced by reacting a milk-coagulating enzyme which is produced by a milk-coagulating enzyme-producing microorganism belonging to genus Aspergillus, genus Mucor, or genus Rhizopus and which exhibits a milk-coagulating activity (A) and a protease activity (B) such that the ratio of (A)/(B) is larger than 0.1, with soymilk thereby inducing coagulation, and collecting a resulting coagulated material. The novel foodstuffs produced have the benefit of lacking the bitterness and astringency common to soybean, abounds in emulsifying activity, exhibit a high water-retention property, and are smoothly agreeable to the taste. Thus, they have extensive utility as substitutes for raw materials in conventional processed foods. They are especially suitable for use as raw materials for emulsifiable foods.

14 Claims, 3 Drawing Sheets

NOVEL FOODSTUFF FROM SOYMILK AND METHOD FOR PRODUCTION THEREOF

BACKGROUND OF THE INVENTION

1. Field of the Invention

This invention relates to novel foodstuffs derived from soymilk, a method for the production thereof, and uses found therefor.

More particularly, this invention relates to novel foodstuffs produced by a method which comprises causing a specific enzyme to react on soymilk thereby inducing coagulation, and collecting a resulting coagulated material.

The term "soymilk" as used in the present invention is defined as referring to soymilk, soymilk containing solid components (bean curds), and other substances similar thereto.

2. Description of the Prior Art

Among the conventional methods for the coagulation of soymilk are the method which comprises adding salts represented by bitter to soymilk, the method which comprises adding acids represented by gluconodeltalactone to soymilk, and the method which comprises use of enzymes represented by protease.

The foodstuffs obtained by the methods using addition of salts and acids, however, produce an intensely rough sensation on the palate, exhibit poor emulsification properties, and have a persistent salty and acidic taste. Thus, they have room for further improvement.

Among the known methods using enzymes are the method which uses a protease (Published unexamined patent application SHO 62(1987)-232,340), the method which used a protease and a magnesium salt (Published unexamined patent application SHO 63(1988)-265), and the methods which use novel soymilk coagulating enzymes of microorganic origin (Published unexamined patent application SHO 61(1986)-282,074, Published unexamined patent application SHO 62(1987)-179,386, and Published unexamined patent application SHO 51(1976)-48,455). The enzymatic methods indeed are capable of producing pasty foodstuffs of smooth savor. These conventional enzymatic methods, however, are inadequate in that they produce foodstuffs in very low yields and the produced foodstuffs possess unpleasant flavors of bitterness and astringency. The method which uses both a protease and a magnesium salt is capable of producing foodstuffs in an improved yield and yet does not overcome the problem of the produced foodstuffs tasting bitter, etc. The foodstuffs produced by the conventional method using a soymilk coagulating enzyme have the problem that they are bitter and astringent, though the degree of bitterness is relatively low. Foodstuffs may be produced by mechanically mixing and stirring soybean flour with water. The foodstuffs obtained by this method, however, are deficient in emulsifiability, smooth palatability, flavor, etc.

Object of the Invention

The inventors have conducted a diligent study with a view to establishing a method for efficient production of novel foodstuffs originating from soymilk and smoothly agreeable to the taste, having neither a bitter or astringent taste nor odor of soybean, and abounding in versatility of use and developing novel processed foods using such foodstuffs. They have consequently found such foodstuffs possessing excellent properties and have extensive utility as materials for various processed foods. This invention has been developed as the result of this study.

It is an object of this invention to provide a method for the production of a foodstuff, characterized by the steps of causing a milk-coagulating enzyme produced by a milk-coagulating enzyme-producing microorganism of genus Aspergillus, genus Mucor, or genus Rhizopus to react on a soymilk thereby inducing coagulation.

It is other object of this invention to provide foodstuffs to be produced by the method described above.

It is a further object of this invention to provide a variety of foods obtained by the use of the foodstuff mentioned above.

Other objects and characteristic features of this invention will become apparent to those skilled in the art as the disclosure is made in the following description of preferred embodiments of the invention, as illustrated in the accompanying drawings.

DETAILED DESCRIPTION OF PREFERRED EMBODIMENTS

Figure 1:
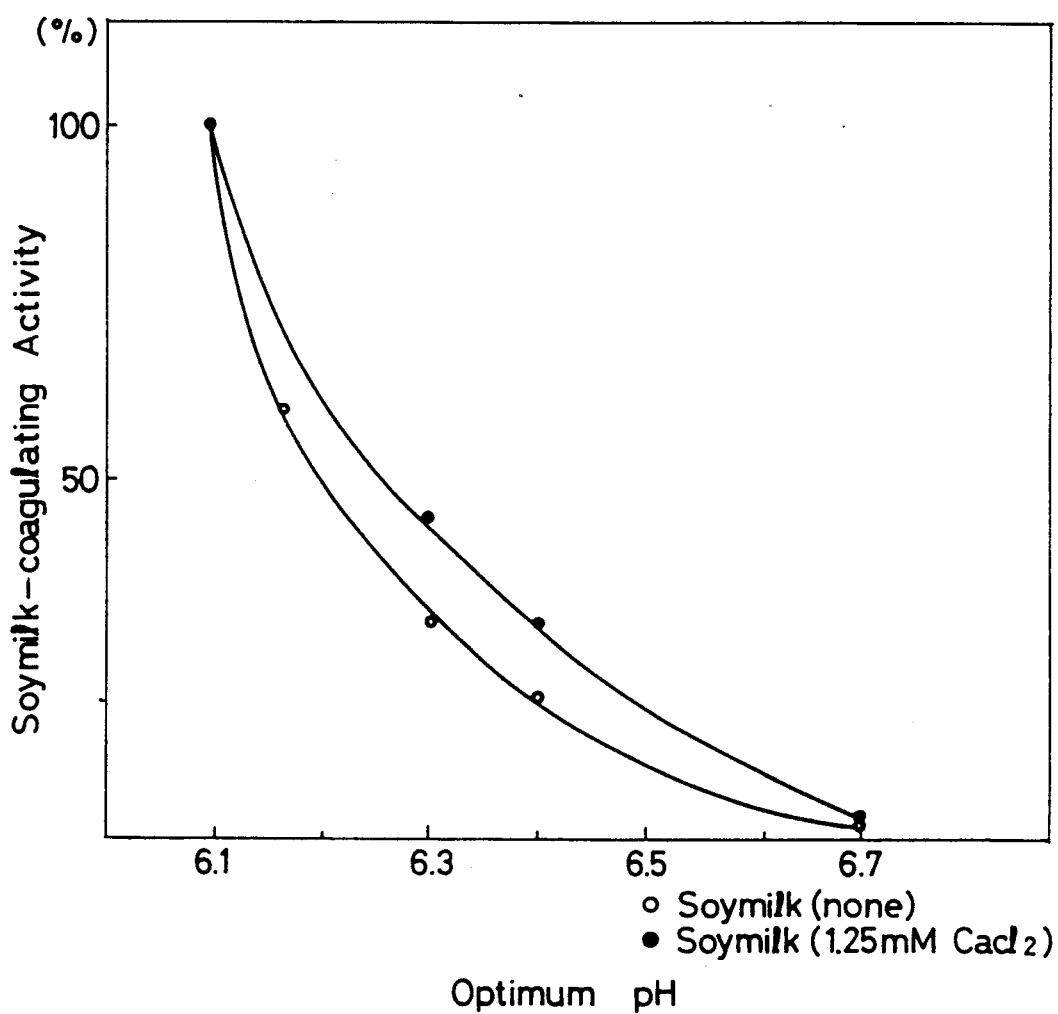
FIG. 1 is a diagram showing the relation between pH and activity of milk-coagulating enzymes and FIG. 2 is a diagram showing the pH stability of the enzymes.

The objects described above are accomplished by a method for the production of a foodstuff, which comprises reacting a milk-coagulating enzyme produced by a milk-coagulating enzyme-producing microorganism belonging to genus Aspergillus, genus Mucor, or genus Rhizopus, the enzyme possessing a protease activity (B) and a milk-coagulating activity (A) such that the ration of $[(A)/B)]$ is larger than 0.1, with soymilk thereby causing a coagulation and collecting resulting coagulated material.

Now, the technical particulars involved in working the present invention will be described specifically below.

(1) Raw material (soymilk)

The soymilk which is usable in this invention includes soymilk produced from soybeans, de-fatted soybeans, and soybean protein and commercially available unprepared soymilk and prepared soymilk. It is permissible to use some of this soymilk in a crude form not stripped of the insoluble component which occurs as a by-produced during the manufacture of soymilk, namely the so-called soybean curd mainly comprised of a fibrous substance. When soymilk is used as a raw material, it is desirable to comminute the soybeans to the smallest possible particle diameter for the purpose of preventing the inevitable, insoluble by-product component from imparting a coarse sensation to the palate. Optionally, such a fiber-decomposing enzyme as pectinase, cellulase, or hemi-cellulase may be allowed to act upon the insoluble component in such crude soymilk.

Particularly, soymilk (containing about 4 (W/W) % of protein, about 2 (W/W) % of fat, and about 3 (W/W) % of saccharide) produced by a method which comprises keeping whole soybean immersed overnight in water to be impregnated, drawing the wet swelled soybeans out of the water, grinding the drained soybeans with a mixer while gradually adding water, heating the resultant mixture to a temperature of about 90° C., cooling the hot mixture, and passing the cooled mixture through a filter cloth, can be used advantageously.

(2) Microorganism and milk-coagulating enzyme

The microorganisms capable of producing a milk-coagulating enzyme which is used in this invention for action upon soymilk include molds of genus Aspergillus, genus Rhizopus, and genus Mucor. The enzyme which is produced by solid culture or liquid culture of such a mold is used. In this case, the correlation between the milk-coagulating activity of the enzyme and the protease activity serving as an index to the formation of a peptide possessing a bitter taste is important. To be specific, the milk-coagulating enzyme is required to be such that exhibits a low protease activity and its milk-coagulating activity is high relative to the protease activity.

For example, when the numerical value of the milk-coagulating activity and that of the protease activity of a given milk-coagulating enzyme calculated by the method indicated in the test example to be cited hereinafter are such that the quotient of the former divided by the latter is not less than 0.1, this enzyme can accomplish the object of this invention.

The following are examples of microorganisms capable of producing milk-coagulating enzymes satisfying the requirement mentioned above.

*Aspergillus sojae* (IFO-4241)
*Aspergillus sojae* (IFO-4386)
*Aspergillus sojae* (IFO-4403)
*Asperqillus sojae* 5119 [FERM BP-2520 (FERM P-10220)]
*Mucor* sp. strain 5121 [FERM BP-2521 (FERM P-10221)]
*Rhizopus* sp. strain 5120 [FERM BP-2522 (FERM P-10222)]

IFO-4241, IFO-4386, and IFO-4403 mentioned above are serial numbers assigned to the relevant microorganisms by the Fermentation Research Institute of Japan. They are microorganisms of the public domain deposited at the Fermentation Research Institute ready for appropriation by any person wishing to use them for the purpose of study.

FERM BP-2520 (FERM P-10220), FERM BP-2521 (FERM P-10221), and FERM BP-2522 (FERM P-10222) are serial numbers assigned to the relevant microorganisms by the Fermentation Research Institute, Agency of Industrial Science and Technology, Ministry of International Trade and Industry of Japan. These are novel microorganisms which the inventors have isolated from the natural world as strains which are particularly advantageous for use in this invention. They are similarly microorganisms of the public domain deposited at the institute mentioned above ready for appropriation by any person wishing to use them for the purpose of study.

Now, the mychological properties of the novel microorganisms, FERM BP-2520 (FERM P-10220), FERM BP-2521 (FERM P-10221), and FERM BP-2522 (FERM P-10222) isolated by the inventors from the natural world will be described below.

*Aspergillus sojae* 5119

Ample growth is attained on the Czapek-Dox medium with formation of yellowish green to green colonies Conidial heads are spherical to cylindrical and conidiophores have no color and a rather rough surface Vehicles are spherical to subspherical. Phialides have a one- to two-stage form. Conidial are spherical to subspherical, possess small projections, and assume no pink color on the anisaldehyde medium.

*Mucor* sp. strain 5121

Growth proceeds quickly on the Sabouraud medium, the potato dextrose medium, the Czapex-Dox medium, and the malt extract medium. A woolly surface is assumed. Colonies are white to yellowish brown. Hyphae lack septum, are aerial and stoloniferous, measure 0.5 to 3.5μ in height, and possess a smooth surface. Zygospores are spherical, spinous, and blackish brown and measure 70 to 80 μm in diameter. Sporangiophores are ramified in the form of uniaxial clusters. Sporangia are spherical and measure 20 to 70 μm in diameter.

*Rhizopus* sp. strain 5120

White to dark brown colonies are formed. Hyphae are rhizoids destitute of septum. Stoloniferous hyphae are formed. Zygospores possess a verrucous surface and are spherical to oval shape and measure 150 to 200 μm in diameter and assume a blackish brown color. Sporangia grow in tufts from rhizoidal parts. No chlamydospore is formed.

(3) Production of enzyme

For the production of enzymes by solid culture, such raw materials as mash, cereal brans, soybean, de-fatted soybean, rice, wheat, and other similar cereals may be used either independently or in various combinations. The raw material is sprinkled with 60 to 150% (W/W), preferably 80 to 120% (W/W), of water and is sterilized. The microorganism is used to inoculate to the prepared substrate which and is then aerobically cultured at a temperature in the range of 10° to 35° C., preferably 25° to 30° C., for a period in the range of 1 to 4 days, preferably 2 to 3 days. After the cultivating is completed, the culture broth is stirred and, a crude enzyme liquid is obtained by extraction. To this crude enzyme liquid is added water of an amount 5 to 20 times, preferably about 10 times, that of the culture broth. The stirred crude enzyme liquid is used in its unaltered form or in a purified form in this invention.

For the production of enzymes by liquid culture, such organic nitrogen-containing substances as various amino acids, malt extract, peptone, and meat extract and such inorganic nitrogen-containing compounds as ammonium chloride, ammonium sulfate, and ammonium sulfate are used either independently or in various combinations as nitrogen sources. The carbon sources which are usable herein include glucose, sucrose, molasses, and various other substances which are generally usable as carbon sources. In addition, minerals and vitamins may be used. The culture temperature is suitably in the range of 25° to 35° C., preferably 27° to 32° C. The culture pH is in the range of 6.0 to 7.0, preferably 6.5 to 6.8.

The culture is carried out under aerobic conditions for a period in the range of 2 to 7 days. After the culturing is completed, the culture broth is centrifuged to remove the exhausted cells and obtain the crude enzyme liquid This crude enzyme liquid is used in its unaltered form or in a purified form in this invention.

The milk-coagulating enzyme as contained in the crude enzyme liquid is satisfactory for use in this invention. Of course, it is more favorable to utilize this enzyme in a purified form.

Now, to illustrate how the purified enzyme is produced for use in this invention, a typical production of a milk-coagulating enzyme by the use of *Mucor* sp. strain 5121 FERM BP-2521 (FERMP-10221) will be cited below. Typical production of purified enzyme 60 g of a mash medium with 100 (W/W) % of water, was inoculated with *Mucor* sp. strain 5121 FERM BP-2521 (FERM P-10221) and cultured at 30° C. for three days. Water of an amount 10 times that of the culture broth From the stirred mixture, 600 ml of a crude enzyme liquid was obtained by extraction. The crude enzyme liquid saturated to 80% with ammonium sulfate was left standing at 40° C. for two to three hours and then centrifuged to recover the precipitated protein. The precipitated protein contained 91.5 mg of protein The precipitated protein was dissolved in a 1.0 M ammonium sulfate-20 mM sodium phosphate buffer. The resultant solution was centrifuged to remove impurities. The residue of the centrifugation was added to a butyl-Toyopeal 650S column (13 ml in volume). The unadsorbed fraction was eluted in the same buffer and then subjected to a linear concentration gradient of ammonium sulfate from 1.0 M to 0 M to effect separation of the enzyme A single active fraction eluted near 0.7 M ammonium sulfate was collected, concentrated, and dialyzed to obtain 20.0 mg of purified milk-coagulating enzyme. The physicochemical attributes of this enzyme were as follows.

(1) Action

The enzyme acted on and coagulated soymilk.

(2) Specificity on substrate

The enzyme mainly coagulated soymilk.

(3) Optimum pH and stable pH range

The enzyme was tested for activity at 50° C. on soymilk adjusted to pH in the range of 5.9 to 7.0. Test runs with and without the addition of an aqueous 1.25 mM calcium chloride solution to the soymilk were performed. The results of the test indicated that the optimum pH was in the neighborhood of 6.1. Below pH 6.0, the determination of activity could not be carried out because the substrate was coagulated at the stage of preincubation (FIG. 1).

Figure 2:
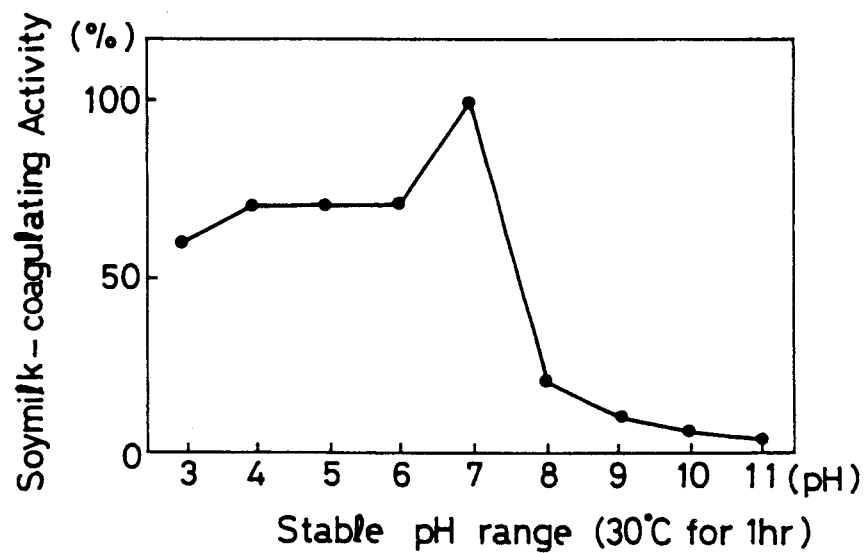

The test for stable pH range was carried out by treating a sample enzyme solution at varying pH value in the range of 3.0 to 11.0 at 30° C. for one hour and determining the activity of the enzyme at pH 6.1 at 50° C. It was found that residual activity exceeding 60% was recognized at any pH value in the range of 3.0 to 7.0 (FIG. 2).

(4) Reacting temperature range and optimum reacting temperature

Figure 3:
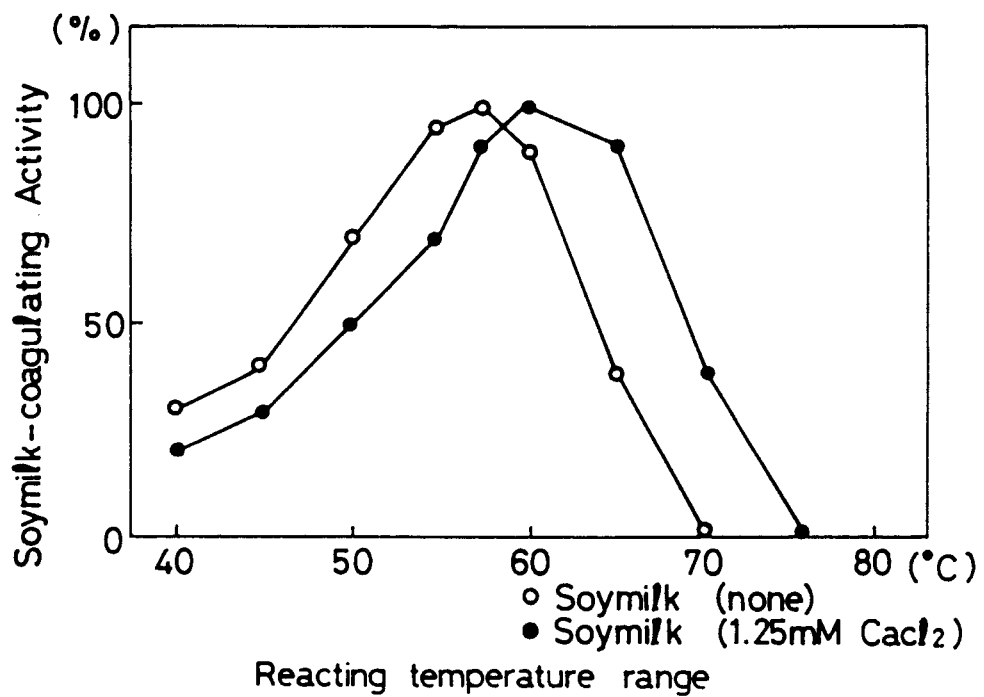
FIG. 3 is a diagram showing the relation between temperature and activity of the enzymes and FIG. 4 is a diagram showing the temperature stability of the enzymes.

On the soybean adjusted to pH 6.1, the enzyme was tested for activity at varying reaction temperatures in the range of 40° C. to 75° C. To the soybean an aqueous 1.25 mM calcium chloride solution was added in one test run but not in another test run. The results of the test indicate that the optimum reacting temperature was 60° C. in the presence of calcium chloride and 57° in the absence of this salt. The relative activity exceeding 50% was observed at varying temperature approximately in the range of 50° to 70° C. in the presence of calcium chloride and at varying temperature approximately in the range of 46° to 64° C. in the absence of this salt. (FIG. 3)

(5) Molecular weight

The molecular weight of the purified milk-coating enzyme was found by gel filtration to be about 35,000.

(6) Thermal stability

Figure 4:
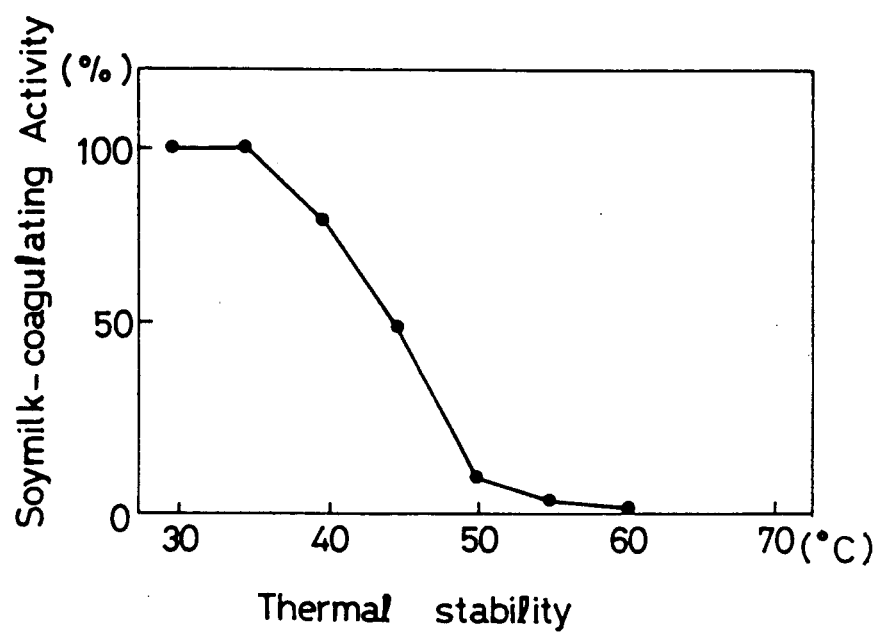

This property was determined by heating the enzyme solution at pH 6.0 at varying temperature for 30 minutes and, after the heating, measuring the residual activity at pH 6.1 at 50° C. The results of this test indicate that the residual activity was 100% at temperatures up to 35° C., 80% at 40° C., and 10% at 50° C. and was basically completely lost at 60° C. (FIG. 4).

(7) Effect of metallic ions on milk-coagulating enzyme (A) On a substrate kept at pH 6.1 and 50° C. and containing 1 mM of a one of a variety of metallic ions, the enzyme was tested for milk-coagulating activity.

The results were as shown in Table 1 below.

All the metallic ions were found to enhance the milk-coagulating activity of the enzyme.

TABLE 1

| Effect of metallic ion on milk-coagulating activity | |
|---|---|
| Metal salt (1 mM/substrate) | Relative milk-coagulating activity (%) |
| None | 100 |
| KCl | 103 |
| FeCl$_3$ | 134 |
| CaCl$_2$ | 245 |
| SnCl$_2$ | 250 |
| MnCl$_2$ | 125 |
| MgCl$_2$ | 234 |
| HgCl$_2$ | 143 |
| ZnCl$_2$ | 188 |
| BaCl$_2$ | 188 |
| CuCl$_2$ | 234 |
| CoCl$_2$ | 118 |
| AlCl$_3$ | 313 |
| NiCl$_2$ | 172 |

(B) The enzyme liquid including 1 mM of one metal salt from the Table 2 was left standing at 30° C. for 30 minutes and then tested for activity at pH 6.1 at 50° C. The results were as shown in Table 2 below.

TABLE 2

| Activation or inhibition of enzyme by metallic ion | |
|---|---|
| Metal salt (1 mM/substrate) | Relative milk-coagulating activity (%) |
| None | 100 |
| KCl | 103 |
| FeCl$_3$ | 65 |
| CaCl$_2$ | 130 |
| SnCl$_2$ | 67 |
| MnCl$_2$ | 85 |
| MgCl$_2$ | 103 |
| HgCl$_2$ | 58 |
| ZnCl$_2$ | 63 |
| BaCl$_2$ | 89 |
| CuCl$_2$ | 119 |
| CoCl$_2$ | 129 |
| AlCl$_3$ | 125 |
| NiCl$_2$ | 110 |

It is clearly noted from the test results of Table 2 that the milk-coagulating activity of the enzyme was enhanced by calcium, copper, cobalt, aluminum, and nickel ion and inhibited by iron, strontium, mercury, and zinc ions.

(8) Inhibition of enzyme with enzyme-inhibiting agent

The enzyme was treated at pH 6.1 at 30° C. with a variety of enzyme-inhibiting agents for 30 minutes and then tested for milk-coagulating activity at pH 6.1 at 50° C. The results of the test were as shown in Table 3 below.

None of the inhibiting agents were found to produce any appreciable inhibition.

TABLE 3
Inhibition of enzyme with enzyme-inhibiting agent

| Inhibiting agent | Concentration (mM) | Residual milk-coagulating activity (%) |
|---|---|---|
| None | — | 100 |
| PCMB | 2 | 91 |
| EDTA | 2 | 75 |
| DFP | 3 | 82 |
| STI | 1 | 75 |
| PI | | 91 |

PCMB = p-chloromercuribenzoic acid
EDTA = ethylenediamine tetraacetic acid
DFP = diisopropyl fluorophosphate
STI = soy-bean trypsin inhibitor
PI = potato inhibitor (4) Method for production of foodstuff The conditions for the reaction of soymilk with the milk-coagulating enzyme will be described. The reaction pH is required to be in the range in which the soymilk will not succumb to formation of coagulated milk by virtue of an acid. Preferably, the reaction is carried out at a pH value in the range of 5.9 to 6.9. A calcium salt or magnesium salt may be included in the reaction system at concentrations such that the added salt will refrain from inducing coagulation of milk. Of course this incorporation of the salt is not required. The concentration of the calcium salt or magnesium salt is desired to be not more than 15 mM.

The reaction temperature is generally satisfactory in the range of 40° C. to 80° C. On the reaction time, it ought to be noted that when the substrate is continuously stirred and the milk-coagulating enzyme is added thereto, the coagulation of milk starts immediately after this addition and reaches completion in a matter of several minutes to one hour. After the coagulation is completed, the reaction mixture is filtered and subjected to centrifugation at about 1500×g, to permit separation of a pasty foodstuff.

(5) Properties of foodstuff

Now, the properties of the novel foodstuff of this invention will be described below. For exemplification, the properties of a pasty foodstuff produced from soymilk derived from soybeans (hereinafter referred to as "foodstuff-A") and those of a pasty foodstuff produced from soymilk not stripped of insoluble component (hereinafter referred to as "foodstuff-B") will be shown in Table 4 below.

TABLE 4

| Raw material | | Foodstuff-A Soymilk | Foodstuff-B Soymilk | Remark |
|---|---|---|---|---|
| Appearance | | Glossy and creamy | Glossy and creamy | |
| Viscosity | | 25000–45000 cp | 25000–45000 cp | Determined with viscosimeter (Tokyo Keiki K.K.) at 20° C. and 10 rpm |
| Analyses | | | | |
| Water content | (W/W) | 70–83% | 70–83% | |
| Protein | (W/W) | 40–50% | 31–41% | On dry basis |
| Lipid | (W/W) | 31–41% | 26–36% | On dry basis |
| Saccharide | (W/W) | 12–22% | 23–33% | On dry basis |
| Flavor | | | | |
| Aroma | | None | None | |
| Taste | | Slight relish | Slight sweetness | |
| Water retaining capacity* | | 7.0–8.5* | 7.0–8.5* | At pH 6.8 |

*This property was determined by diluting the foodstuff with water of an amount 10 times that of the foodstuff, stirring them, retaining the resultant mixture at 70° C. for 30 minutes, centrifuging the mixture at 1000 × g for five minutes, weighing the residue of centrifugation, and dividing the weight by the dry weight of the foodstuff (JIS 2601).

The effects of pH and temperature on the emulsion stability were as shown in Table 5.

TABLE 5

| Temperature | Foodstuff | pH 6.5 | 6.0 | 5.0 | 4.0 | 3.0 |
|---|---|---|---|---|---|---|
| Normal room temperature | A | o | o | o | o | o |
| | B | o | o | o | o | o |
| | E | o | o | o | o | o |
| 80° C. 10 minutes | A | o | Δ | Δ | Δ | o |
| | B | o | Δ | Δ | Δ | o |
| | E | x | x | x | Δ | Δ |
| 90° C. 10 minutes | A | o | Δ | Δ | Δ | o |
| | B | o | Δ | Δ | Δ | o |
| | E | x | x | x | Δ | Δ |
| 120° C. 10 minutes | A | o | x | x | Δ | o |
| | B | o | x | x | Δ | o |
| | E | x | x | x | x | x |

Remarks: In Table 5, A stands for Foodstuff-A, B for Foodstuff-B, and E for Foodstuff-B incorporating egg yolk therein. The stability was rated on the three-point scale, wherein o stands for perfect stability, Δ for the phenomenon of coagulation which occurs at the end of heating and ceases to exist on exposure to a stirring action, and x for persistent coagulation.

It is clearly noted from the result of Table 5 that the foodstuff of the present invention far excelled the typical cream prepared by addition of egg yolk in terms of thermal stability of emulsification.

(6) Utilization of foodstuff

The foodstuffs obtained by the present invention can be utilized extensively for soybean-based foods such as fermented soybeans (NATTO), bean paste (MISO), and bean curd (TOFU), dairy products such as cheese, yogurt, ice cream, pudding, and kefir, emulsifiers for use in mayonnaise, dressing, and margarine, and substitutes for fats, household dishes such as soup, croquettes, and humburger, desserts such as mousse and jelly, pasty products such as boiled fish paste and sausage, cakes, and noodles. Thus, use of the foodstuffs produces novel foods of fine quality.

To explain specifically the method for production of the novel foodstuffs of this invention and the uses found therefor, working examples will be cited below.

EXAMPLE 1

*Aspergillus sojae* (IFO 4241) was used to inoculated 30 g of a masch medium with 100 (W/W) % of water which was then cultured at 30° C. for three days. The resultant culture broth was stirred into water of an amount 10 times that of the culture broth. From the stirred mixture, 300 ml of a crude enzyme liquid was obtained by extraction. Then, to 500 ml of soymilk adjusted to pH 6.1, the enzyme liquid was added in a concentration of 5 (V/W) % and left reacting therewith by heating at 65° C. for 10 minutes. The resultant reaction mixture was cooled and centrifuged at 1500×g for 15 minutes, to produce 200 g of a pasty foodstuff having a water content of 81 (W/W) %.

EXAMPLE 2

The crude enzyme obtained in Example 1 was reacted with soymilk. Five hundred (500) ml of a liquid containing 20 (W/W) % of finely ground soybean was adjusted to pH 6.1, then heated to 95° C. for 15 minutes, and then cooled to 65° C. To this liquid, the crude enzyme of Example 1 added in a concentration of 10 (V/W) % was allowed to react for 20 minutes. The resultant reaction mixture was cooled and centrifuged at 1500×g for 15 minutes, to produce 320 g of a pasty foodstuff having a water content of 77 (W/W) %.

EXAMPLE 3

*Aspergillus soaje* (IFO 4403) was used to inoculated a liquid medium containing 2 (W/W) % of glucose, 2 (W/W) % of malt extract, and 1 (W/W) % of peptone which was then shaken during culturing at 30° C. for three days. The resultant culture broth was deprived of exhausted cells. The crude enzyme liquid was added in a concentration of 5(V/W) % to 500 ml of soymilk adjusted to pH 6.1 and allowed to react therewith at 65° C. for 10 m minutes. The resultant reaction mixture was cooled and centrifuged at 1500×g for 15 minutes, to produce 180 g of a pasty foodstuff having a water content of 80.8 (W/W) %.

EXAMPLE 4

The crude enzyme liquid obtained by culturing *Aspergillus sojae* 5119 [FERM BP-2520 (FERM P-10220)] in the same manner as in Example 1 was added in a concentration of 5 (V/W) % to 500 ml of soymilk adjusted to pH 6.1 and allowed to react therewith at 65° C. for 10 minutes. The resultant reaction mixture was cooled and centrifuged at 1500×g for 15 minutes, to produce 250 g of a pasty foodstuff.

EXAMPLE 5

The crude enzyme liquid obtained by culturing *Mucor* sp. strain 5121 [FERM BP-2521 (FERM P-10221)]in the same manner as in Example 1 was added in a concentration of 5 (V/W) % to 500 ml of soymilk adjusted to pH 6.1 and allowed to react therewith at 65° C. for 10 minutes. The resultant reaction mixture was cooled and centrifuged at 1500×g for 15 minutes, to produce 190 g of a pasty foodstuff.

EXAMPLE 6

The crude enzyme liquid obtained by liquid culturing *Rhizopus* sp. strain 5120 [FERM BP-2522 (FERM P-10222)] in the same manner as in Example 3 was added in a concentration of 5 (V/W) % to 500 ml of soymilk adjusted to pH 6.1 and allowed to react therewith at 65° C. for 10 minutes The resultant reaction mixture was cooled and centrifuged at 1500×g for 15 minutes, to produce 180 g of a pasty foodstuff.

Now, various foods using the pasty foodstuffs obtained as described above will be demonstrated below as Examples 7 to 15.

EXAMPLE 7: (FERMENTED SOYBEANS)

From the foodstuff-A and foodstuff-B mentioned above, pasty foods possessed of heretofore unattainable creamy constitution and flavor distinctive to fermented soybeans (NATTO) were produced by the following procedure.

The foodstuff-A and foodstuff-B were fermented with a fermented soybeans-producing microorganism (of *Bacillus subtilus*) or with 1 to 2 (W/W) % of commercially available fermented soybeans. The fermenting temperature was in the range of 35° to 42° C., preferably 37° to 40° C. and the fermenting period was approximately in the range of several hours to two days. The fermentation mixture was stirred at a rate of 100 to 300 rpm to create aerobic conditions. The stirring could be omitted. A varying food could be used as accessory raw material when necessary.

The foods produced by the procedure mentioned above were smoothly agreeable to the taste unlike food fermented soybeans and retained the flavor distinctive to fermented soybeans and exhibited a highly desirable thread-drawing properly due to the formation of polyglutamic acid. They exceeded commercially available fermented soybeans in emulsifiability and affinity for fats, water and other foods.

The foodstuff-A and foodstuff-B which possessed the flavor of fermented soybeans were delicious eaten either all by themselves or in conjunction with such foods as seasoned preserves of fish and plant origins, or served as accessory dishes for rice, noodles, and soups. The analyses of the fermented-soybeans foods derived from the foodstuff-A and foodstuff-B were as shown in Table 6 below.

TABLE 6

|  |  | Foodstuff-A fermented soybeans | Foodstuff-B fermented soybeans | Commercially available fermented soybeans* |
| --- | --- | --- | --- | --- |
| Water content | (W/W) | 82.4% | 82.0% | 59.5% |
| Protein content | (W/W) | 7.2 | 6.4 | 16.5 |
| Fat content | (W/W) | 5.8 | 5.5 | 10.0 |
| Saccharide content | (W/W) | 2.1 | 4.0 | 9.8 |
| Viscosity |  | 38000 cp | 40000 cp | Unmeasurable |
| pH |  | 6.0 | 6.1 |  |

*Table of Food Components, 4th edition (published by Joshi Eiyo Univ. Press, 1988, Page 69)

EXAMPLE 8: (VEGETABLE CHEESE)

Vegetable cheese products possessing a of heretofore unattainable creamy constitution were obtained from the foodstuff-A and foodstuff-B by the following procedure.

The foodstuff-A and foodstuff-B were dried to a water content of about 60 (W/W) % and each formed in the shape of a disc 11 cm in diameter and 3 cm in thickness. It was permissible to incorporate therein at a concentration of about 2%. It was also permissible to add calcium chloride or potassium nitrate as a fermentation regulator. Separately, a medium consisting of sterilized dices of bread, was inoculated with *Penicilium camemberti* and cultured at 20° C. for 7 to 10 days. The culture discs of fully grown hyphae were pulverized. The discs of foodstuff-A and foodstuff-B were smeared with the resultant powder for fermentation. The discs were then left aging at 15° C. with a relative humidity of 85 to 90% for about two to three weeks. The aged discs were ground to produce a creamy vegetable cheese.

This vegetable cheese was a low-calorie food possessing the flavor of cheese and was delicious eaten all by itself or as converted into cheese cake or dessert. The analyses of the vegetable cheese using the foodstuff-A and foodstuff-B were as shown in Table 7 below.

TABLE 7

|  |  | Foodstuff-A Solid cheese | Foodstuff-B Solid cheese | Commercially available camembert cheese |
|---|---|---|---|---|
| Water content | (W/W) | 63.0% | 63.0% | 51.8% |
| Protein content | (W/W) | 17.1 | 14.4 | 19.1 |
| Fat content | (W/W) | 11.8 | 10.8 | 24.7 |
| Saccharide content | (W/W) | 4.5 | 8.5 | 0.9 |

*Table of Food Components, 4th edition

EXAMPLE 9: (VEGETABLE YOGURT)

From the foodstuff-A and foodstuff-B mentioned above, vegetable yogurt products of a heretofore unattainable creamy constitution were obtained by the following procedure.

Starters of *Lactobecillus casei* and *Lactobacillus plantalum* were used to inoculate the foodstuff-A and foodstuff-B. The desired fermentating temperature was in the range of 30° to 42° C., preferably 35° to 37° C. The satisfactory fermentating was in the range of 12 to 48 hours. The analyses of the vegetable yogurt products using the foodstuff-A and foodstuff-B were as shown in Table 8.

TABLE 8

|  |  | Foodstuff-A Vegetable Johgurt | Foodstuff-B Vegetable Johgurt | Commercially available Plain Johgurt |
|---|---|---|---|---|
| Water content | (W/W) | 81.8% | 82.4% | 88.0% |
| Protein content | (W/W) | 7.0 | 6.5 | 3.2 |
| Fat content | (W/W) | 5.7 | 5.4 | 3.0 |
| Saccharide content | (W/W) | 2.5 | 4.3 | 5.0 |
| pH |  | 4.1 | 4.0 | 4.0 |
| Acidity | (W/W) | 0.70 | 0.72 | 0.7–0.8 |

*Table of Food Components, 4th edition

The vegetable yogurt products were creamy and possessed the flavor peculiar to yogurt. They were delicious eaten all by themselves or as prepared in the form of salad or dressing.

EXAMPLE 10: (BEAN PASTE)

The foodstuff-A and foodstuff-B sterilized, and combined as shown below, were placed in a beaker having an inner volume of 1 liter, covered with a resin wrap (polyvinylidene chloride), left and aging and at 30° C. for 3 to 6 days, to produce bean paste (MISO) of excellent flavor and high flowability.

| Foodstuff-A or foodstuff-B | 100 parts |
|---|---|
| Rice blan | 30 parts |
| Common salt | 20 parts |
| Yeast starter | + |
| Lactic acid bacteria starter | + |

*Saccharomyces rouxii* as the starter for yeast and *Pediococcus halophilus* as the starter for lactic acid bacteria were each added in a concentration of $10^5$ cells/g.

EXAMPLE 11: (DRESSING)

Emulsifying type dressings were produced by blending the foodstuff-A and foodstuff-B with other ingredients in the ratios shown below. They were low-calorie dressings of a low fat content and were delicious.

| Foodstuff-A or foodstuff-B | 50% (W/W) |
|---|---|
| Vinegar | 20% (W/W) |
| Sugar | 5% (W/W) |
| Table salt | 2% (W/W) |
| Flavor enhancer (protein hydrolyzate) | 1% (W/W) |
| Tackifier (xanthan gum) | 0.1% (W/W) |
| Water | + |

EXAMPLE 12: (PUDDING)

Puddings were produced by blending the foodstuff-A and foodstuff-B with other ingredients in the ratios shown below, heating the mixtures at 90° C. for about 30 minutes, and allowing the hot mixtures to cool off. The puddings were of a vegetable composition and were delicious.

| Foodstuff-A or foodstuff-B | 35% (W/W) |
|---|---|
| Sugar | 15% (W/W) |
| Whipped cream | 5% (W/W) |

| | |
|---|---|
| Gelling agent (gelatin) | 1% (W/W) |
| Water | + |

EXAMPLE 13: (ICECREAM)

Icecream products were obtained by blending the foodstuff-A and foodstuff-B with other ingredients at ratios shown below, churning the blends in a household icecream maker, and freezing them They were vegetable in quality and were delicious.

| | |
|---|---|
| Foodstuff-A or foodstuff-B | 40% (W/W) |
| Salad oil | 6% (W/W) |
| Margarine | 7% (W/W) |
| Sugar | 20% (W/W) |
| Vanilla | Slightly |
| Water | + |

EXAMPLE 14: (SOUP)

Soups were produced by blending the foodstuff-A and foodstuff-B with other ingredients at ratios shown below and diluting the resultant mixtures with milk to twice the original volume. These soups had good body and were delicious.

| | |
|---|---|
| Foodstuff-A or foodstuff-B | 12% (W/W) |
| Corn starch | 2% (W/W) |
| Wheat flour | 4% (W/W) |
| Sugar | 1% (W/W) |
| Table salt | 1% (W/W) |
| Spice | Slightly |
| Bouillon | 1% (W/W) |
| Onion | 5% (W/W) |
| Water | + |

EXAMPLE 15: (FISH MEAT SAUSAGE)

Fish-meat sausages were produced by mixing the foodstuff-A and foodstuff-B with other ingredients at ratios indicated below, grinding the resultant mixtures at 4° C. for minutes, placing the blends in casings, heating them at 40° C. for 30 minutes and then at 80° C. for 30 minutes, and allowing the hot casings to cool off. The fish meat sausages had elasticity, excelled in water-retention, and were delicious.

| | |
|---|---|
| Frozen pollack paste | 100 parts |
| Foodstuff-A or foodstuff-B | 30 parts |
| Corn starch | 10 parts |
| Flavor enhancer (sodium glutamate) | 1 part |
| Fuming liquid | 1 to 2 drops |

From the foodstuff-A and foodstuff-B, mayonnaise, mousses, jelly, margarine, croquet, hamburger, soybean curd, fish paste, and noodles of fine quality could be produced In the production of a foodstuff by the coagulation of soymilk with a milk-coagulating enzyme, the foodstuff is perfectly free from offensive soybean odor, bitterness or astringency and can be produced in a high yield when this enzyme possesses a protease activity (B) and a milk-coagulating enzyme (A) such that the ratio [(A)/(B)]is relatively high. Now, a typical experiment demonstrating this fact will be cited below Experiment:

The extracts of malts of IFO-4241, IFO-4386, IFO-4403, FERM BP-2520 (FERMP-I0220), FERM BP-2521 (FERMP-10221), and FERM BP-2522 (FERMP-10222) obtained by culturing these microorganisms in the same manner as in Examples 1 to 6 were used as milk-coagulating enzymes. Prior to use, they were tested for milk-coagulating activity and protease activity.

Coagulation occurred when 5 ml of soymilk was uniformly mixed with 60 units of a given milk-coagulating enzyme liquid at 65° C., the resultant mixture was allowed to stand at rest for 10 minutes, and then the mixture was cooled to normal room temperature. A pasty substance was obtained by centrifuging the mixture at 1500×g for 15 minutes The yield of this pasty substance was calculated from the ratio of recovery The pasty substance was evaluated for taste by a sensory test conducted by a panel of 10 members. The evaluation was directed to discriminating between presence and absence of bitterness and astringency.

For comparison, the following three commercially available milk-coagulating enzymes were subjected to the same test as described above.

Commercially available enzyme 1:
Product designation "Protease N"

| | |
|---|---|
| Manufacturer - Amano Pharmaceutical Co., Ltd. | |
| Origin - Bacillus subtilis | |

Commercially available enzyme 2:
Product designation "Alkalase"

| | |
|---|---|
| Manufacturer - Nobo Industry Co., Ltd. | |
| Origin - Bacillus lichenitormis | |

Commercially available enzyme 3:
Product designation "Bromelain F"

| | |
|---|---|
| Manufacturer - Amano Pharmaceutical Co., Ltd. | |
| Origin - Pineapple canery | |

The results of the test were as shown in Table 9 below.

TABLE 9

Comparison of milk-coagulating activity and protease activity and evaluation of foodstuff

| Origin | Enzyme concentration | Milk-coagulating activity (μ/ml), A | Protease activity (μ/ml), A | A/B | Bitterness | Astringency | Yield (W/W) % |
|---|---|---|---|---|---|---|---|
| Aspergillus sojae IFO 4241 | Extract of molds | 72 | 474 | 0.15 | No | No | 78 |
| Aspergillus sojae IFO 4386 | | 60 | 300 | 0.20 | No | No | 80 |
| Aspergillus sojae IFO 4403 | | 60 | 274 | 0.22 | No | No | 79 |
| Aspergillus sojae 5119 FERM BP-2520 (FERMP-10220) | | 90 | 272 | 0.33 | No | No | 85 |
| Rhizopus sp. strain 5120 (FERM P-10222) | | 20 | 30 | 0.67 | No | No | 75 |

TABLE 9-continued

Comparison of milk-coagulating activity and protease activity and evaluation of foodstuff

| Origin | Enzyme concentration | Milk-coagulating activity (μ/ml), A | Protease activity (μ/ml), A | A/B | Bitterness | Astringency | Yield (W/W) % |
|---|---|---|---|---|---|---|---|
| Mucor sp. strain 5121 (FERM P-10221) | | 60 | 50 | 1.20 | No | No | 77 |
| Baccilus subtilis (Commercially available enzyme 1) | 2.5 mg/ml | 30 | 525 | 0.06 | Yes | Yes | 65 |
| Baccilus lichemitormis (Commercially available enzyme 2) | 2.5 mg/ml | 20 | 400 | 0.05 | Yes | Yes | 69 |
| Pineapple canery (Commercially available enzyme 3) | 2.5 mg/ml | 40 | 571 | 0.07 | Yes | Yes | 68 |

It is clearly noted from Table 9 that the milk-coagulating enzyme used this invention has a relatively high milk-coagulating activity and a relatively low protease activity and the quotient of the milk-coagulating activity divided by the protease activity is not less than 0.1 and that the effect particular to the present invention is obtained only when a milk-coagulating enzyme meeting this description is used.

It has been established that a pasty foodstuff of excellent quality can be produced in a high yield only when the milk-coagulating enzyme to be used possesses a low protease activity and a high milk-coagulating activity relative to the protease activity Other comparative tests based on properties other than bitterness, astringency, and yield gave similarly positive results for the pasty foodstuff of this invention.

In the present invention, the determination of enzymatic activity was carried out by the following procedure.

(1) Determination of milk-coagulating enzyme

The milk-coagulating activity, or the soymilk-coagulating activity, was determined by partially modifying the method proposed by K. Arima et al. (Agric. Biol. Chem., 31, 540, 1967) as follows On 5 ml of soymilk adjusted to pH 6.1 with an aqueous 1 M $NaH_2PO_4$ solution, 0.5 ml of a suitably diluted enzyme solution was allowed to react at 65° C. for determination of the soymilk-coagulating activity. The amount of the soymilk coagulated per unit enzyme by the reaction performed for 30 minutes under the conditions mentioned above was taken as a coagulation unit. For example, when the enzyme solution is diluted with water to four times the original volume and is coagulated in 20 minutes in the reaction performed under the conditions mentioned above, the coagulation activity is found as follows:

$$\frac{1}{0.5} \times 5 \times \frac{30}{20} \times 4 = 60 \text{ (units/ml of enzyme solution)}$$

(2) Determination of protease activity

The activity at pH 6.1 determined by the casein digestion method (Kunitz method) using milk casein (Hammarsten-Casein) as a substrate was reported as neutral and alkali protease activity.

The protease activity was determined by taking 2.0 ml of a reaction mixture composed of 0.1 ml of enzyme solution, 1.0 ml of 0.1 M phosphate buffer (pH 6.1), and 0.5 ml of 2% milk casein (with 0.4 ml of deionized water added thereto), heating the solution at 65° C. for 30 minutes to induce reaction, then stopping the reaction by addition of 2.0 ml of 0.4 M TCA (trichloroacetic acid), allowing the resultant reaction mixture to stand at rest and induce precipitation of unaltered casein, centrifuging (1500×g for 10 minutes) the reaction mixture, collecting 2.0 ml of the supernatant, and testing this supernatant for absorbance with a spectrophotometer (280 nm of wavelength). As a blank, the supernatant collected after 0 minute of reaction time was similarly tested. The casein was dissolved with a small amount of dilute caustic soda, adjusted to pH 6.1 by the addition of dilute hydrochloric acid or dilute NaOH solution, and then diluted with the buffer to a concentration of 2 (W/W) %.

As to concerns of the potency of the enzyme, the increment of absorbancy was converted into a tyrosine equivalent based on the difference between the absorbancy of the sample and that of the blank, the amount of the enzyme assuming a color equalling the color of 1 μg of tyrosine per minute was reported as 1 unit.

What is claimed is:

1. A method for the production of a foodstuff, which comprises treating soymilk with a milk-coagulating enzyme produced by a milk-coagulating system enzyme-producing microorganism selected from the group consisting of *Aspergillus sojae* (IFO- 4241), *Aspergillus sojae* (IFO-4386), *Aspergillus sojae* (IFO-4403), *Aspergillus sojae* 5119 FERM BP-2520 (FERMP-10220), *Mucor* sp. strain 5121 FERM BP-2521 (FERMP-10221) and *Rhizopus* sp. strain 5120 FERM BP-2522 (FERMP-10222), said enzyme possessing a protease activity (B) and a milk-coagulating activity (A) such that the ratio of (A)/(B) is larger than 0.1, and collecting a resultant coagulated material.

2. The method according to claim 1, wherein said milk-coagulating enzyme has the following physico-chemical characteristics of:
   (i) a stable pH between 3.0 and 7.0;
   (ii) a working temperature between 46° and 64° C. in the absence of calcium chloride;
   (iii) a working temperature between 50° and 70° C. in the presence of calcium chloride;
   (iv) a molecular weight of approximately 35,000 as determined by gel electrophoresis;
   (v) a residual activity that is about 100% at a temperature up to 35° C., about 80% at 40° C., about 10% at 50° C. and lost at 60° C.;
   (v) increased milk-coagulating activity in the presence of metallic ions; and
   (vii) resistant to inhibition by enzyme-inhibiting agents.

3. The method according to claim 2 wherein said pH is about 6.1.

4. The method according to claim 2 wherein said working temperature is 60° C. in the presence of calcium chloride and 57° C. in the absence of calcium chloride.

5. The method according to claim 2 wherein said enzyme-inhibiting agents are p-chloromethcrylbentoic acid, ethylenediamine-tetracetic acid, diisoprpyl-fluorophosphoric acid, soybean trypsin inhibitor and potate inhibitor.

6. A foodstuff produced by the method according to claim 2.

7. A food comprising said foodstuff according to claim 6.

8. A foodstuff produced by a method set forth in claim 1.

9. A food comprising a foodstuff according to claim 8.

10. The food according to claim 9, which is fermented soybeans (NATTO).

11. The food according to claim 9, which is cheese.

12. The food according to claim 9, which is yogurt.

13. The food according to claim 9, which is bean paste.

14. The food according to claim 9, which is one member selected from the group consisting of dressing, pudding, icecream, mayonnaise, mousse, jelly, soup, margarine, croquettes, hamburger, soybean curd, boiled fish past, sausage, kefir, and noodles.

* * * * *